(12) United States Patent
Krajewski et al.

(10) Patent No.: US 8,776,372 B2
(45) Date of Patent: Jul. 15, 2014

(54) CAST MAGNESIUM ALLOY WHEELS

(75) Inventors: Paul E. Krajewski, Troy, MI (US); Ravi Verma, Shelby Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 572 days.

(21) Appl. No.: 12/557,583

(22) Filed: Sep. 11, 2009

(65) Prior Publication Data

US 2011/0062770 A1    Mar. 17, 2011

(51) Int. Cl.
  *B21H 1/02*    (2006.01)
  *B21K 1/28*    (2006.01)
  *B21K 1/34*    (2006.01)

(52) U.S. Cl.
  CPC .... *B21K 1/28* (2013.01); *B21K 1/34* (2013.01)
  USPC ..... 29/894.3; 29/894; 29/894.324; 29/894.36

(58) Field of Classification Search
  CPC ................ B23P 9/02; B23P 6/00; B23P 9/00; B23P 25/00; B23P 2700/50; F16C 2223/02; F16C 2223/04; B21K 1/34; B21K 1/40; B21K 1/28
  USPC .................... 29/894, 894.3, 894.32, 894.324, 29/894.325, 894.33, 894.333, 894.34, 29/894.35, 894.36, 894.362
  See application file for complete search history.

(56) References Cited

U.S. PATENT DOCUMENTS

| 5,722,165 | A  | * | 3/1998 | Kobayashi et al. ...... 29/894.325 |
| 6,143,097 | A  |   | 11/2000 | Fujita et al. |
| 6,152,351 | A  |   | 11/2000 | Separautzki et al. |
| 6,536,111 | B1 | * | 3/2003 | Baumgarten et al. .... 29/894.324 |
| 2005/0035179 | A1 | * | 2/2005 | Forrest et al. .............. 228/112.1 |
| 2005/0212350 | A1 | * | 9/2005 | Yamamoto et al. ...... 301/63.101 |
| 2006/0032891 | A1 | * | 2/2006 | Flak et al. .................. 228/112.1 |
| 2008/0154423 | A1 | * | 6/2008 | Badarinarayan et al. ..... 700/175 |

FOREIGN PATENT DOCUMENTS

| CN | 1623763 | 6/2005 |
| CN | 1680122 | 10/2005 |

OTHER PUBLICATIONS

P.Cavaliere, P.P. De Marco; Fatigue behaviour of friction stir processed AZ91 magnesium alloy produced by high pressure die casting; Materials Characterization, vol. 58, pp. 226-232; 2007.

* cited by examiner

*Primary Examiner* — Christopher Besler
(74) *Attorney, Agent, or Firm* — Reising Ethington P.C.

(57) ABSTRACT

A method of imparting superior fatigue performance to a vehicle wheel cast from a magnesium alloy by selective application of friction stir processing to regions of the casting known to be subject to high in-service stresses is described. The method may be particularly applicable to open wheel designs in which a plurality of spokes is used to connect the hub and rim portions of the wheel.

11 Claims, 4 Drawing Sheets

CAST MAGNESIUM ALLOY WHEELS

TECHNICAL FIELD

This invention relates to the manufacture and processing of automotive vehicle wheels fabricated from cast magnesium alloys, especially wheels having radial spokes connecting the rim and hub portions of the wheels. More specifically this invention relates to the use of friction stir processing on predetermined portions of the cast wheels to improve their physical properties.

BACKGROUND OF THE INVENTION

Both for appearance and to maximize air flow to the brakes, automobile wheel styling has tended to emphasize open designs in which the tire-bearing rim is supported on slender spokes or columns connecting the rim to the hub. This is particularly true for alloy (aluminum or magnesium) wheels and is beneficial in reducing wheel mass but results in the imposition of higher stresses than obtain in a wheel designed with a more traditional, generally disc-shaped, spider.

In vehicle use, wheels experience repeated cyclic loads and operate under adverse corrosion conditions. Despite this, wheels are required to exhibit a suitable service lifetime and to achieve this goal current magnesium wheels are forged, primarily to improve their performance under cyclic loading. However magnesium is a difficult material to forge and only a few magnesium alloys are forgeable, which limits the number of magnesium alloys which may be selected. Further it limits the range of wheel designs which may be economically produced, since complex wheel designs cannot be substantially realized by forging alone but they require a combination of forging and extensive machining.

However, tests and simulations demonstrate that wheels are not uniformly stressed but rather experience high stresses only in local regions. This suggests that rather than improving the fatigue performance of the entire wheel, through forging, selective improvement in fatigue performance of a cast magnesium wheel in high stress areas would be equally beneficial in meeting performance goals. Thus a procedure capable of identifying the highly stressed regions and imparting selective fatigue performance improvement would enable the application of reduced cost cast magnesium wheels with performance at least equivalent to that of current forged wheels.

SUMMARY OF THE INVENTION

This invention provides a method for making cast vehicle wheels of a magnesium alloy selected for a wheel application. In many embodiments a selected magnesium alloy will be cast by die casting, either high pressure or low pressure die casting, or by squeeze casting to reduce porosity in the cast wheel. The method is applicable to many wheel designs (solid and open) but is particularly useful where the wheel uses spokes to connect the rim with the wheel hub.

The shape of the wheel is analyzed in consideration of the physical properties of the cast magnesium alloy material. A goal of the structural analysis may be to determine regions of the cast wheel in which an improvement in fatigue strength may be required. In accordance with embodiments of this invention, surfaces of such cast wheel regions may be subjected to friction stir processing conducted to thermoplastically work the surface in a solid-state mode to improve its mechanical properties, such as its fatigue strength.

An engineering analysis of structural loading of a prospective light metal alloy cast wheel design is a first step to determining whether friction stir processing may be useful. In use, loads applied at the tire-road contact patch are transferred through the wheel to the axle. When the wheel design uses spokes, the tire load passes to the wheel rim and is then conveyed by the spokes to the hub. The response of the wheel rim to this loading is generally less important than the response of the spokes. A particular loading condition of concern to wheel designers is the loading resulting from cornering which applies a rotating bending moment to the hub which will cause the spokes to flex out of the plane of the wheel. The wheel spokes, for purposes of analysis, may be treated as columns extending from the rim to the hub of the wheel. Thus cornering forces applied at the tire contact patch will manifest themselves as a load applied at the end of a cantilevered beam and will generate high stresses at the connection of the spoke (beam) and hub.

Thus, the fatigue strength of the wheel may be increased if it is possible to selectively improve the capabilities of the material in those high stress regions which are most prone to failure, such as the region where the spoke joins the hub. A technology for doing this is friction stir processing.

Friction stir processing is a process derivative of friction stir welding and involves the interaction between a workpiece and a generally cylindrical, rotating tool with a pin protruding from one of its planar bounding surfaces thereby creating a shoulder on the tool. The pin is generally aligned with the axis of tool rotation. As the tool is rotated and pressed against a predetermined surface region of a cast wheel, the rotating pin commences heating of the contacted surface. The rotating pin locally heats the contacted material, lowering its flow strength, and enabling significant plastic flow which permits the pin to penetrate into the softened metal to its full length. Thus the length of the pin should be determined to penetrate to a desired depth below the surface of a cast wheel. At full tool penetration, the shoulder of the tool substantially contacts the surface of the workpiece over a region based on the diameter of the shoulder.

The rubbing of the shoulder on the workpiece due to tool rotation will also generate frictional heating and locally raise the workpiece temperature. The combined effects of pin and shoulder are employed to successively work and strengthen regions of the cast wheel workpiece. The rotating tool may engage the wheel surface at one or more fixed spots such as at the rim ends of spokes of the wheel. Or the tool may be moved while penetrating a treated wheel surface to process an area of the workpiece that is larger than the contacting surfaces of the tool.

Friction stir processing imparts significant loads to the part. In many applications where the workpieces may be supported by an external structure it is possible to process the workpiece to a depth substantially equal to its thickness. The complex geometry of wheels will generally preclude introducing a support structure in the rear except for relatively simple designs. Thus much of the processing will result from pin penetrations of less than the full wheel thickness. This may be sufficient to enable the desired durability improvement or it may be necessary to make two passes with the friction stir processing tool—one pass on the front wheel surface and a second on the opposing surface on the reverse surface of the wheel.

The local workpiece temperature is less than the melting point of the workpiece but sufficient to reduce its strength and render it more malleable. Hence the heated, softened region under the tool shoulder will be deformed as the rotating pin induces a stirring action in the workpiece leading to local deformation and transport of workpiece material about its axis of rotation. The combination of these complex metal flows and the elevated temperature will result in both grain refinement and porosity elimination or reduction. Thus friction stir processing may confer, locally, many of the advantages obtained globally through forging. Specifically addressing fatigue life improvements in magnesium alloys, fatigue life improvements in excess of a factor of 10 in the long-life regime have been reported.

The fatigue life of metal components is also strongly affected by the surface condition of the component, with smoother surfaces promoting longer fatigue lives than rougher surfaces. While friction stir processing will generate an improved microstructure with more fatigue-resistant properties the surface finish of a friction stir processed component is not smooth. Thus the surface of the wheel will generally be machined after friction stir processing to improve its durability under fatigue load as well as to impart a more pleasing appearance to the wheel.

A further advantage of friction stir processing, however, is that a much wider range of alloys may be friction stir processed than may be forged. This affords the opportunity to select cast alloys with other desirable attributes, for example corrosion resistance, with the assurance that, by selective friction stir processing, acceptable fatigue life may be achieved.

Thus this invention seeks to selectively friction stir process cast magnesium alloy wheels with good corrosion resistance to impart superior fatigue resistance to those regions of the wheel which are subject to the highest in-service stresses.

DESCRIPTION OF PREFERRED EMBODIMENTS

Figure 1:
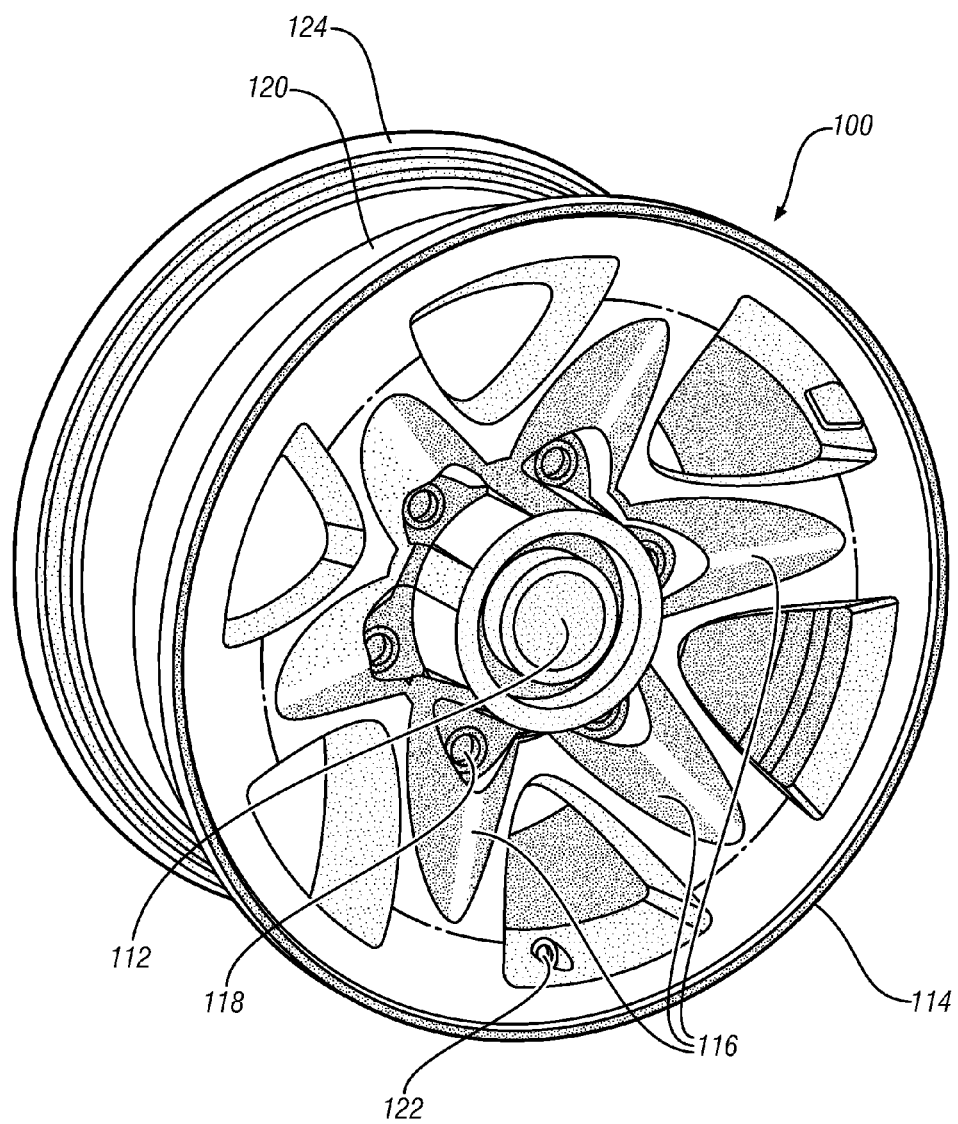
FIG. 1 shows an alloy wheel for a passenger vehicle representative of those to which this invention may be applied.

FIG. 1 illustrates a wheel 100 suitable for the practice of this invention, which exhibits the spoke-like configuration which will generate high stresses at the hub under cornering loads. Specifically FIG. 1 indicates a wheel with a hub 112 including bolt holes 118 for attachment of the wheel to the wheel hub (not shown) of the vehicle. Hub 112 is connected to rims 114 and 124 by columnar spokes 116. In service a tire (not shown) will be mounted on and sealed against wheel rims 114 and 124 to create a sealed air volume between the interior of the wheel cavity and the tire when opening 122 is sealed with a valve suitable for controlled removal and addition of air.

Figure 2:
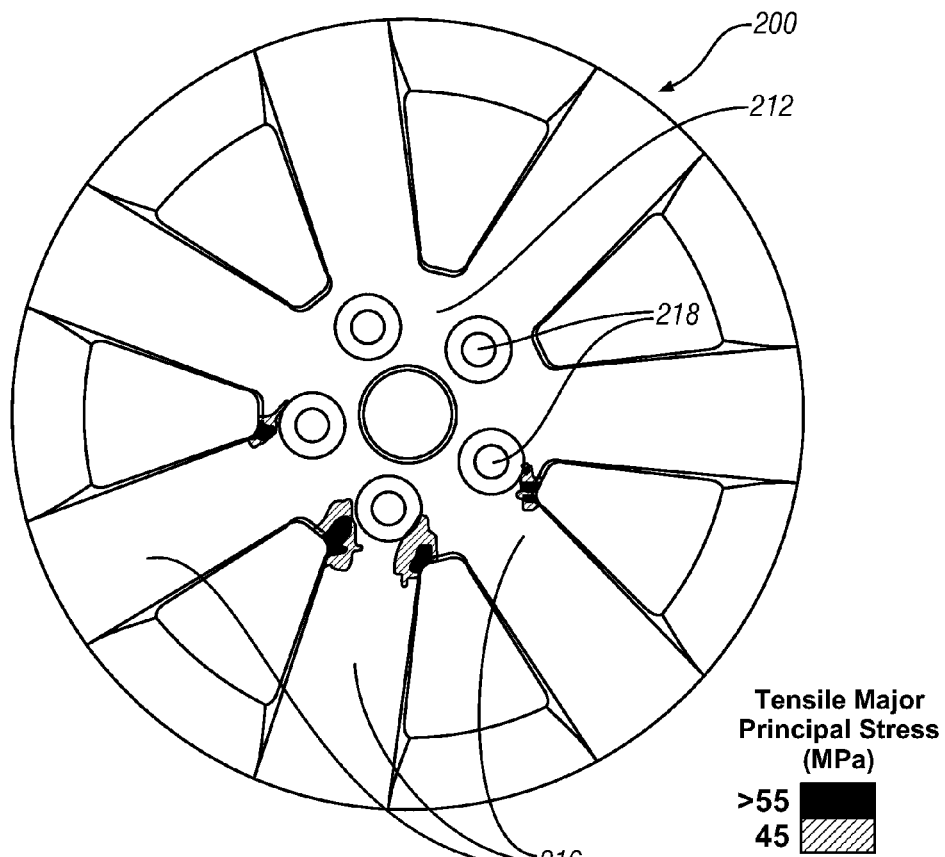
FIG. 2 shows a representative wheel design onto which have been mapped contour lines showing the magnitudes of the largest tensile values of the major principal stresses developed during a specific evaluation procedure for wheel response to in-service loading—a Cornering Fatigue Test. It will be appreciated that as the wheel rotates only a portion of the tire (wheel) will be in contact with the road so that the applied loads will be localized and directional. The stresses shown are instantaneous stresses which will rotate around the wheel as the wheel rotates and the stresses shown in the lower spokes in FIG. 2 will be experienced by all spokes in sequence as the wheel rotates.

FIG. 2 shows a second, but similar, representative wheel 200 which has been analyzed to determine the stresses throughout the wheel under a test intended to simulate the loading occurring on hard cornering. Clearly, consistent with the simple beam analogy described above, the highest tensile stresses, which can be significant, develop where the columnar-like spokes 216 and hub 212 join. Note that in this design the bolt holes 218 are not aligned with spokes 216

Figure 3:
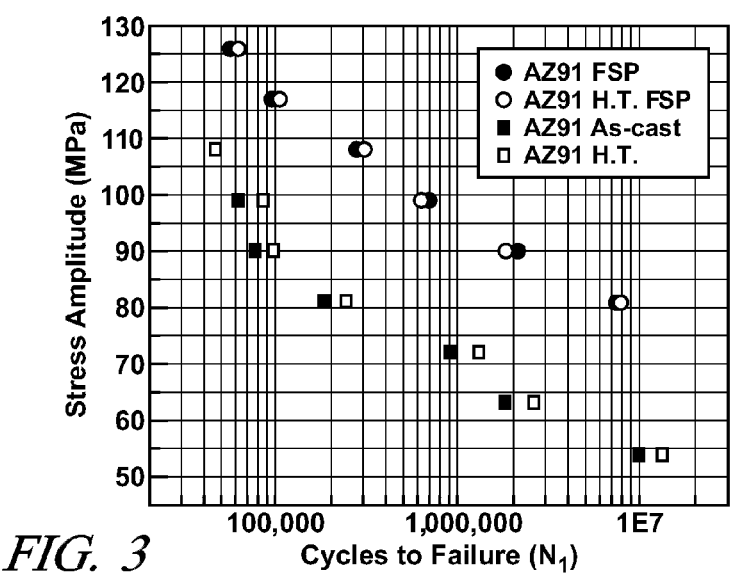
FIG. 3 shows experimental test data on the fatigue life of magnesium AZ91 test coupons produced by high pressure die casting. The conditions of the test coupons include: as-cast; heat treated; friction stir processed; and heat treated and friction stir processed.

FIG. 3 shows experimental fatigue data on a high pressure die cast AZ91 magnesium alloy (nominal composition by weight: 8.3-9.1% aluminum; 0.4-1.0% Zn; balance magnesium) tested under four conditions: as-cast; as cast and heat treated (indicated as AZ91 H. T.); as-cast and friction stir processed (indicated as AZ91 FSP); and as-cast and heat treated and then friction stir processed (indicated as AZ91 H. T. FSP). It is clear that while heat treating the casting offers some modest advantage in fatigue life, the major enhancement in fatigue life is obtained by friction stir processing, which raises the stress at which a fatigue life of $1\times10^7$ cycles is obtained from around 55 MPa to around 75 MPa. Although not relied upon, this improvement was attributed to reduction in grain size and the essential elimination of (micro) porosity in the stirred zone.

Figure 4:
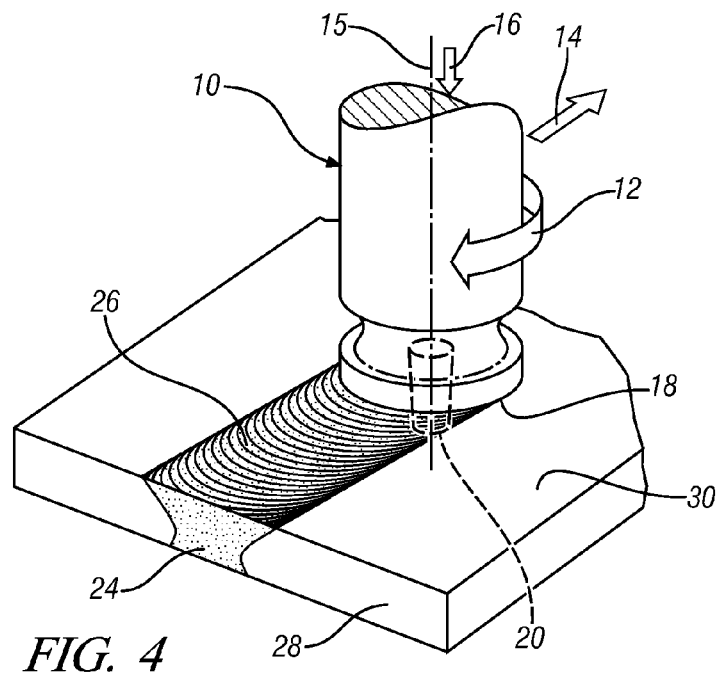
FIG. 4 is a schematic illustration of friction stir processing, showing the general tool geometry, the stirred or processed zone and the roughened surface left after the passage of the tool.

Thus significant advantage in fatigue lifetime may be achieved through friction stir processing. Friction stir processing is schematically depicted in FIG. 4 which shows a tool 10, with shoulder 18 and pin 20, rotating about its axis 15 as indicated by arrow 12 and advancing in a direction indicated by arrow 14. The underside of shoulder 18 is in contact with upper surface 30 of workpiece 28 and pin 20 is embedded in workpiece 28 where it has generated a stirred region 24. Shoulder 18 is maintained in contact with surface 30 of the workpiece 28 by a force directed substantially along axis 15 and the motion of tool 10 along surface 30 has led to some surface roughening 26 in the wake of the advancing tool.

From review of FIG. 4 several points may be appreciated. First, it may be noted that the rotation of the tool transports workpiece material around the tool. However, although the workpiece has been heated by frictional heating it does not reach its melting point and therefore remains solid. Thus, the stirring action results in large plastic strains and the combination of the large plastic strain and elevated temperature induces thermoplastic processing in the solid state which is beneficial in refining the grains size reducing or eliminating porosity.

Note that the stirring action is entirely associated with the pin and thus the width of the stirred zone will be directly related to the pin diameter. Conversely if it is desired to confer the benefits of friction stir processing on a large area it is necessary either to employ a large diameter pin 20 or to make repeated passes over the area, offsetting the pin position with each pass. A second point is that the function of the shoulder is two-fold: to enforce the stirring action of the pin by acting as a barrier to any up-flow of material; and to generally heat the stirred zone through frictional interaction with the surface 30. It may be noted that to be effective in controlling the up-flow of material the underside of shoulder 18 should closely conform to surface 30. This is easily accomplished for flat surfaces like that depicted in the figure but is more challenging on contoured surfaces such as would be encountered on a wheel. Thus it may be necessary to impose design restrictions on the shape of the wheel where friction stir processing is contemplated to ensure good entrainment of the stirred material.

A specific point which should be comprehended in the design is to control the transition from the spoke to the hub since the maximum stresses, as FIG. 2 makes clear, will occur in that region. Thus the transition should be gradual to enable use of simple friction stir processing tools. Alternatively, since some machining will be required after friction stir processing to render a smooth surface, it may be more practical to design the casting to facilitate friction stir processing and generate any desired product features through machining. For example by casting a flat surface all along the desired friction stir processing path, and only after friction stir processing introduce the desired contour in this region by machining. Or start with a flat as-cast surface all along the desired friction stir processing path, and after FSP machine the surface to give the desired contour. This machining may not be an extra step, since the rough friction stir processed surface will require machining anyway as discussed below.

Figure 5:
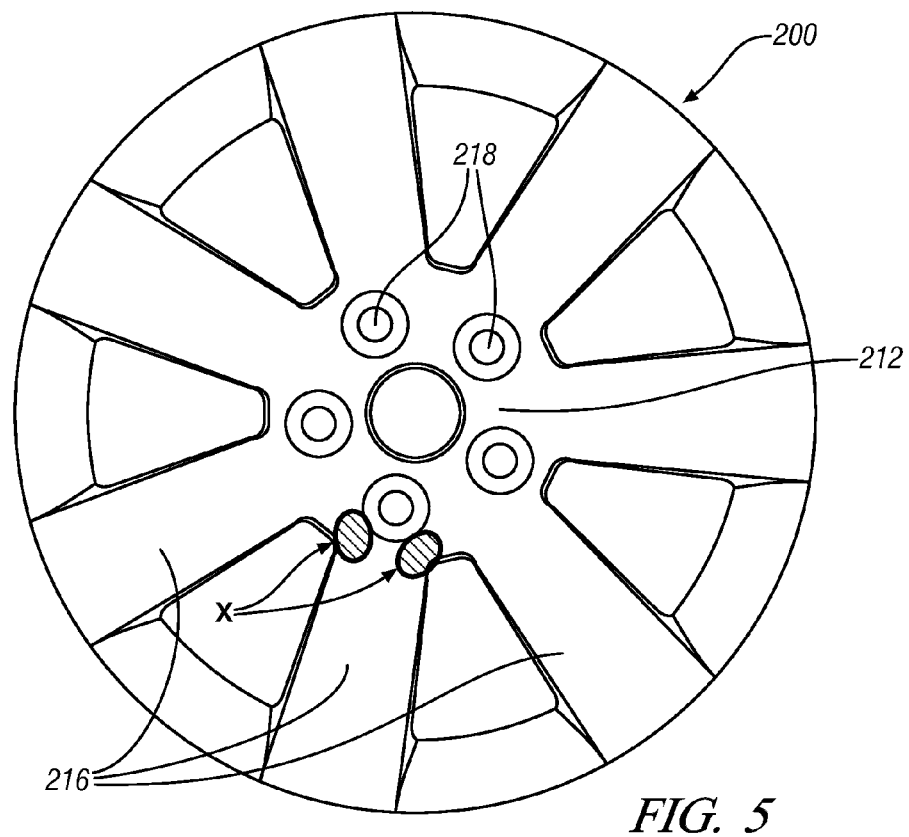
FIG. 5 shows the wheel design of FIG. 2 further illustrating the regions of preferred friction stir processing, which by reference to FIG. 2 are shown to be the regions where the highest major principal stresses are developed under the Cornering Fatigue Test. As noted in conjunction with FIG. 2, all spokes experience similar loading and thus will require similar processing.

Through analysis of FIG. 2 it is clear that the maximum tensile stresses occur on the edges of the wheel spokes. Thus these regions are the obvious candidate regions for friction stir processing as indicated by X in FIG. 5. It will be appreciated however that since the goal is to improve fatigue life and since fatigue life is adversely affected by surface imperfections, the surface roughness left by the tool shoulder (26 in FIG. 4) should be removed before the wheel is placed in service.

Issues not addressed in the discussion to this point relate to the insertion and extraction of the tool 10 corresponding to the initiation and termination of friction stir processing. Since the pin 20 extends beyond shoulder 18, it is clear that on initial insertion of the pin into the workpiece the portion of the workpiece displaced by the pin will be unconstrained by the shoulder. Thus on first workpiece-pin contact, material will be displaced upward out of the stirred region so that this material will be lost to the stirred zone and if the pin were extracted a cavity corresponding to the displaced material would remain on the surface. Similarly at the end of the process, extraction of the pin will leave a cavity in the surface. Obviously these cavities may be detrimental to fatigue life and thus may not be tolerated in the finished wheel. Various suggestions have been put forward for more complex tools, for example incorporating retractable pins, or for modifying tools to enable addition of filler metal, to overcome this general deficiency of friction stir welding and processing. However it is not clear that the benefits of these tooling approaches offset their additional complexity.

Figure 6:
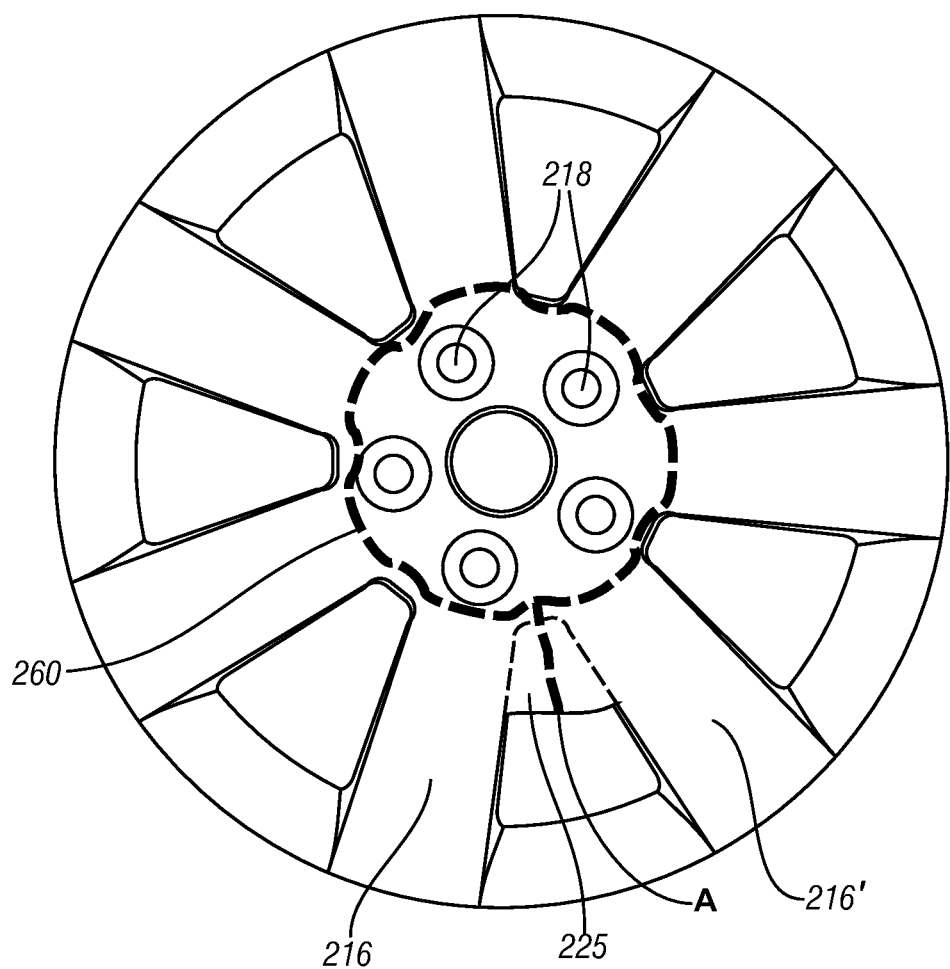
FIG. 6 shows the as-cast geometry of the wheel design of FIG. 2 on which a representative path for friction stir processing has been overlaid and also illustrating material additions to facilitate friction stir processing. In most applications these material additions will be subsequently machined off.

An alternative and more direct approach is to cast a wheel blank incorporating dispensable features to serve as locations for the entrance and exit of the friction stir tool from the wheel, and, after serving that purpose, to be machined off. An example is shown in FIG. 6. Here the casting geometry has been modified to form an additional cast section 225 which partially spans the gap between spokes 216 and 216'. Friction stir process tool path 260 is shown as a dotted line which traverses all of the spokes and particularly traverses those regions previously identified as subject to high stresses. Friction stir tool path 260 however originates and terminates at location A in the additional cast section 225, thus enabling all critical wheel regions to be traversed without need of tool insertion or withdrawal. Hence the undesirable surface features resulting from tool insertion or withdrawal are confined to additional cast section 225 which may be machined off after friction stir processing has been conducted.

An alternative approach is to use the bolt hole locations 218. If cast as solid, they may be used to provide entry and/or exit locations for the friction stir tool. In this case the cavity left behind on withdrawal of the tool could simply be used as a pilot hole for a drill to facilitate creating an initial hole.

The overall process may best be understood by consideration of an example.

EXAMPLE

Suitable materials for wheels are die cast magnesium alloys AZ91D (nominal composition by weight: Aluminum 9%, zinc 1%, balance magnesium and AM50A (nominal composition by weight: Aluminum 5%, manganese 0.26-0.60%, balance magnesium). AZ91D has slightly higher strength but AM50A has better ductility and toughness.

The alloys should be melted under protective atmosphere. Traditionally this has usually been air with small additions (typically less than 0.2%) of sulfur hexafluoride, $SF_6$. However, for die casting the holding temperature may be held to below 700° C. which enables the use of alternate shielding gases such as Argon-$CO_2$ —$N_2$ mixtures.

Typical section sizes for wheels range from as little as 3 to 4 mm at the wheel rim to up to 35 mm at the hub, with the spokes exhibiting thicknesses intermediate between these values, generally from about 15 mm to 25 mm. Although several processes, including Squeeze Casting and Modified High Pressure Die Casting, are believed suitable for cast magnesium wheel manufacture, current practice favors Low Pressure Die Casting techniques with mold temperatures in the range of 220° C. to 240° C. and typical fill times of between 20 and 30 seconds. Also it is generally beneficial apply a pressure of between 40 and 100 MPa during solidification to minimize porosity and gas inclusions. These may also be suppressed by partial evacuation of the mold prior to casting. To avoid sticking of the part to the mold wall a mold lubricant should be applied but since mold lubricants are typically diluted with water they should be applied sparingly to avoid heat loss in the die through vaporization of the water.

Wheel performance will typically have been subject to preliminary assessment through modeling and these results may be relied upon to identify the high stress regions. Alternatively or additionally, the high stress regions may be identified or confirmed by conducting a cyclic fatigue test following the procedures outlined in the Society of Automotive Engineer's SAE J328 standard which describes two basic test procedures: a cornering fatigue test directed toward the wheel disc and a radial fatigue test directed toward the wheel rim and attachment portion of the wheel.

However achieved, once the highly stressed regions of the wheel have been identified, suitable friction stir processing path(s), with appropriate entry and exit locations and embracing all of the highly stressed regions should be identified and friction stir processing initiated. Preferably, as depicted at 260 on FIG. 6, all high stress regions may be processed using a single continuous path, but a series of shorter paths which treat the high stress regions individually or in small groups is also acceptable. There is some flexibility in the choice of tool geometry and operating conditions but a tool with a shoulder diameter of 20 mm, pin diameter 6 mm and pin length 4 mm operated at 400 rpm and a traverse rate of 100 mm/min produces acceptable results. It may be necessary or preferred to make more than one circuit with the tool if the extent of the highly stressed regions exceeds the size of the processed zone. It may also be necessary or preferred to make circuits on the visible and hidden surfaces of the wheel to more completely propagate the effects of processing through the entire thickness of the wheel.

When friction stir processing is complete, the wheel may be machined, typically by end-milling to remove surface features resulting from friction stir processing and, if necessary, impart final shape to the wheel.

While the invention has been described by way of example and in terms of the preferred embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method for fabricating a cast magnesium alloy wheel having thickness and enhanced fatigue resistance and intended for use on an automotive vehicle, the wheel having a designed structure comprising a hub connected to a rim by a plurality of spaced radial spokes, where magnesium alloy castings of the designed wheel structure comprise inherently fatigue-prone regions, the fatigue-prone regions having a thickness, the method consisting essentially of:
    casting a wheel of a selected magnesium alloy using a selected casting process;
    thermoplastically working the inherently fatigue-prone regions of the as cast wheel by friction stir processing in the solid state to refine the grain size and enhance the fatigue performance of the wheel, the thermoplastic working extending substantially through the thickness of the wheel at the fatigue-prone regions; and then
    machining the wheel to remove any surface roughening due to friction stir processing and to render a desired surface finish and topography.

2. The method of claim 1 wherein the wheel spokes have connection portions with the hub, the connection portions being fatigue-prone regions.

3. The method of claim 1 wherein the fatigue-prone regions of the wheel are identified through mathematical modeling or through experimental investigation.

4. The method of claim 1 wherein the friction stir processing comprises traversing a rotating friction stir tool along an at least one of a plurality of paths, wherein each of the plurality of paths traverses an at least one fatigue-prone region.

5. The method of claim 1 wherein the selected magnesium alloy is AZ91 or AMF50.

6. A method for fabricating a cast magnesium alloy wheel having thickness and processed for enhanced fatigue performance and intended for use on a vehicle, the fabricated wheel having a design where magnesium alloy castings display fatigue-prone regions, each fatigue-prone region having a thickness, the method comprising:
    casting a wheel with dispensable features of a selected magnesium alloy using a selected casting process;
    friction stir processing each of the inherently fatigue-prone regions of the as cast wheel to thermoplastically work the regions by traversing a rotating friction stir tool along at least one of a plurality of paths, wherein each of the plurality of paths traverses at least one fatigue-prone region and originates and terminates in dispensable features of the wheel, the thermoplastically worked region having a depth which is substantially equal to the thickness of the wheel at the inherently fatigue-prone regions; and
    machining the wheel to remove the dispensable features, remove any surface roughening due to friction stir processing and to render a desired surface finish and topography.

7. The method of claim 6 wherein the selected casting process is a die casting process.

8. The method of claim 6 wherein the inherently fatigue-prone regions of the wheel are identified through mathematical modeling or through experimental investigation.

9. The method of claim 6 wherein the selected magnesium alloy is AZ91 or AMF50.

10. The method for fabricating a cast magnesium alloy wheel recited in claim 1 in which the wheel has opposing front and reverse surfaces and the friction stir processing is performed on both the front and reverse wheel surfaces.

11. The method for fabricating a cast magnesium alloy wheel recited in claim 6 in which the wheel has opposing front and reverse surfaces and the friction stir processing is performed on both the front and reverse wheel surfaces.

* * * * *